United States Patent
Sakai et al.

(10) Patent No.: US 10,773,426 B2
(45) Date of Patent: Sep. 15, 2020

(54) RESIN MOLDING MOLD

(71) Applicant: TANAZAWA HAKKOSHA CO., LTD., Higashiosaka-shi, Osaka (JP)

(72) Inventors: Masayuki Sakai, Higashiosaka (JP); Hisao Aota, Higashiosaka (JP)

(73) Assignee: TANAZAWA HAKKOSHA CO., LTD., Higashiosaka-Shi, Osaka (JP)

( * ) Notice: Subject to any disclaimer, the term of this patent is extended or adjusted under 35 U.S.C. 154(b) by 311 days.

(21) Appl. No.: 15/501,173

(22) PCT Filed: Apr. 15, 2016

(86) PCT No.: PCT/JP2016/062084
§ 371 (c)(1),
(2) Date: Feb. 1, 2017

(87) PCT Pub. No.: WO2017/018007
PCT Pub. Date: Feb. 2, 2017

(65) Prior Publication Data
US 2017/0225364 A1 Aug. 10, 2017

(30) Foreign Application Priority Data
Jul. 30, 2015 (JP) .................. 2015-151143

(51) Int. Cl.
B29C 33/42 (2006.01)
B29C 33/38 (2006.01)
(Continued)

(52) U.S. Cl.
CPC ............ B29C 33/424 (2013.01); B29C 33/38 (2013.01); B29C 33/42 (2013.01); B29C 33/56 (2013.01);
(Continued)

(58) Field of Classification Search
CPC ......... B29C 33/56; B29C 33/62; B29C 33/38; B29C 45/26; B29C 45/37; B29C 59/022; B29K 2995/0097; B29K 2995/0012
See application file for complete search history.

(56) References Cited

U.S. PATENT DOCUMENTS 2,624,916 A * 1/1953 Persak .................... B29C 33/56
264/328.16
5,362,226 A 11/1994 Kataoka et al.
(Continued)

FOREIGN PATENT DOCUMENTS

JP          61027212 A  *  2/1986  ............ B29C 33/56
JP          H04-90316 A     3/1992
(Continued)

OTHER PUBLICATIONS

Wikipedia ("Glossnneter", 2014) https://en.wikipedia.org/wiki/Glossmeter (Year: 2014).*

Primary Examiner — Joseph S Del Sole
Assistant Examiner — Jerzi H Moreno Hernandez
(74) Attorney, Agent, or Firm — Rabin & Berdo, P.C.

(57) ABSTRACT

A resin molding mold in accordance with the present application is a resin molding mold for molding a resin molded product. The resin molding mold includes a molding mold and a mirror-surface coat layer formed on a mold surface of the molding mold. The mirror-surface coat layer is formed by a thermosetting resin having a thermal conductivity in a range from 0.10 W/(mK) or more to 0.99 W/(mK) or less. The thickness of the mirror-surface coat layer is set in a range from 1.0 μm or more to 30 μm or less, and is preferably set to 20 μm or less. The surface of the mirror-surface coat layer is provided with a flat-surface maintaining part formed into a substantially flat surface.

1 Claim, 2 Drawing Sheets

(51) Int. Cl.
*B29C 45/37* (2006.01)
*B29C 33/56* (2006.01)
*B29C 59/02* (2006.01)

(52) U.S. Cl.
CPC .......... *B29C 45/372* (2013.01); *B29C 59/022* (2013.01); *B29K 2995/0012* (2013.01); *B29K 2995/0097* (2013.01)

(56) References Cited

U.S. PATENT DOCUMENTS

| | | | | |
|---|---|---|---|---|
| 5,653,932 A * | 8/1997 | Aida | ................... | B29C 45/0025 264/219 |
| 2004/0156945 A1 * | 8/2004 | Yoon | ........................ | B29C 33/56 425/575 |
| 2005/0133962 A1 * | 6/2005 | Mumme | ............. | B29C 33/3828 264/334 |
| 2008/0061214 A1 * | 3/2008 | Lee | ........................ | B29C 33/424 249/112 |
| 2009/0285927 A1 * | 11/2009 | Ueno | ...................... | B29C 33/62 425/436 R |
| 2010/0075149 A1 * | 3/2010 | Yoneshima | ............. | B29C 33/10 428/409 |
| 2013/0026675 A1 * | 1/2013 | Yoneshima et al. | .... | B29C 33/38 264/220 |
| 2014/0015162 A1 * | 1/2014 | Kusuura | ............... | B29C 33/424 264/219 |

FOREIGN PATENT DOCUMENTS

| | | | | |
|---|---|---|---|---|
| JP | H11-320627 A | | 11/1999 | |
| JP | 2001-062843 A | | 3/2001 | |
| JP | 2001062843 A | * | 3/2001 | ......... B29C 33/3842 |
| JP | 2003-039440 A | | 2/2003 | |
| JP | 2003039440 A | * | 2/2003 | |
| WO | WO-93/06980 A1 | | 4/1993 | |

* cited by examiner (a)     (b)

RESIN MOLDING MOLD

FIELD OF THE INVENTION

This invention relates to a resin molding mold, and more particularly concerns such a resin molding mold for molding a resin molded product that has high luster on the product surface of the resin molded product and also provides a high-quality feeling.

BACKGROUND OF THE INVENTION

Conventionally, for example, resin molded products serving as interior parts for automobiles, in particular, instrument-panels, garnishes, etc., disposed around windows, need to have a high-quality feeling. Such a resin molded product is formed by preparing a molding mold on which a surface treatment referred to as an embossing process is carried out, and by using the molding mold. Thus, on the surface of the resin molded product, a minute pattern of concavo-convex portions referred to as embossing is formed.

The purpose of forming such embossing lies in that by giving delicate shadows or appropriate luster and touch by the hand onto the surface of a resin molded product, a high-quality feeling is provided from a designing point of view. On the other hand, embossing also has practical purposes, such as making a defective external appearance, such as weld lines, irregularities and the like peculiarly occurred on the product surface in the case of an injection molding by using plastic materials, less conspicuous, and also preventing scratches from occurring on the product surface, or making them less conspicuous.

In this case, for example, as described in Patent Document 1, an embossing product molding mold has been disclosed. In the case of forming embossing on an injection molding mold for an embossing product having a complicated concavo-convex shaped pattern, that is, a so-calling satin embossing pattern, on a metal mold surface, the concavo-convex portions, which are formed by carrying out an etching process on a flat metal mold surface without concavo-convex portions, are formed so as to have concavo-convex intervals in a range from 0.3 to 0.5 mm to which a blast projection material is easily put in a blasting process to be described later so as to adjust its ten-point average roughness (Rz) of the concavo-convex portions in a range from 20 to 40 μm, and next, by carrying out a blasting treatment on the concavo-convex surface by using a beads-state blast projection material under conditions of a particle size of 100 to 200 meshes and a compression pneumatic pressure of 0.2 to 0.4 MPa at the time of blasting, corrosion irregularities due to the etching and under-cuts due to corrosion remaining on the surface of embossing concavo-convex portions are evenly adjusted, and as a finishing treatment, by applying a beads-state blast projection treatment with a particle size of 100 to 200 meshes, selected so as to sufficiently enter the embossing concavo-convex intervals and to allow the blasting traces of the blast projection material to be not so fine or so rough, under a compression pneumatic pressure lower than that of the above-mentioned blasting treatment by the beads-state blasting projection material and higher than 0.2 MPa, fine left-overs of the concavo-convex portions remaining in the inside depths of the concave portions of the embossing concavo-convex portions are eliminated and burrs caused by the blasting traces of the beads-state blast projection material itself are flattened so that the smooth surface of embossing concavo-convex portions only having the traces by the beads-state blast projection material is formed; thus, the above-mentioned Patent Document has disclosed an embossing product molding mold capable of producing an embossing product having high luster and high-quality feeling, which makes a defective external appearance, such as weld lines, irregularities and the like, less conspicuous, and also has a superior scratch-resistant property.

PRIOR-ART DOCUMENTS

Patent Document

Patent Document 1: Japanese Patent Application Laid-Open No. 11-320627

SUMMARY OF THE INVENTION

Problems to be Solved by the Invention

However, as described above, in the case of Patent Document 1, since adjustments between the concavo-convex intervals for an embossing process onto the surface of the molding mold are required, and since a plurality of blasting processes are required after the embossing process on the surface of the molding mold, many processes are required. Moreover, it is considered that it is difficult to uniformly carry out these many processes on the entire embossing process surface.

Therefore, the object of the present invention is to provide a resin molding mold capable of generating gloss on a resin molded product surface comparatively easily, even in the case when applied to a resin molding mold having concavo-convex portions by embossing process, and of obtaining a resin molded product having improved texture by providing high luster.

Means for Solving the Problem

A resin molding mold in accordance with the present invention is used for molding a resin molded product, and the resin molding mold is provided with a molding mold and a mirror-surface coat layer formed on the surface of the mold face of the molding mold, and the mirror-surface coat layer is formed by using a thermosetting resin having a thermal conductivity in a range from 0.10 W/(mK) or more to 0.99 W/(mK) or less, and the thickness of the mirror-surface coat layer is set in a range from 1.0 μm or more to 30 μm or less, and the resin molding mold is characterized in that the surface of the mirror-surface coat layer is provided with a flat-surface maintaining part that is formed into a substantially flat surface.

Moreover, in the resin molding mold in accordance with the present invention, the thickness of the mirror-surface coat is preferably set to 20 μm or less.

In accordance with the resin molding mold of the invention, since the surface of the mirror-surface coat layer has the flat-surface maintaining part formed into a substantially flat surface, and since the thickness of the mirror-surface coat layer is set in a range from 1.0 μm or more to 30 μm or less, it is possible to prevent scratches (galling) due to protrusions on the inside surface of the molding mold relative to the drawing direction and scratches caused by tension or rubbing given to the resin molded product having embossing due to its resin contraction at the time of curing process from occurring on the resin molded product at the time of drawing the resin molded product from the resin molding mold.

Moreover, since the thickness of the mirror-surface coat layer is set in a range from 1.0 μm or more to 30 μm or less, it is possible to suppress disturbance due to waving on the surface of the mirror-surface coat layer occurring at the time of evaporation of a solvent component contained in a mixed solution for use in forming the mirror-surface coat layer.

Furthermore, since the thickness of the mirror-surface coat layer is set in a range from 1.0 μm or more to 30 μm or less, it is possible to suppress liquid dripping at the time when a mixed solution is applied onto the mold surface 12a of the molding mold 12 with concavo-convex portions formed thereon by embossing process so as to form the mirror-surface coat layer 16.

Since the thickness of the mirror-surface coat layer is set in a range from 1.0 μm or more to 30 μm or less, the layer becomes resistant to a more number of injection-molding processes for resin molded products.

As described above, since the flat-surface maintaining part of the mirror-surface coat layer of the resin molding mold is capable of ensuring a stable flat-surface state, it becomes possible to prevent a defective external appearance from occurring on the product surface of a resin molded product when an injection-molding process is carried out by using this resin molding mold, thereby making it possible to obtain a resin molded product having improved texture by providing high luster.

Moreover, in the case when the thickness of the mirror-surface coat layer is set to 20 μm or less, it becomes possible to more effectively suppress disturbance due to waving on the surface of the flat-surface maintaining part of the mirror-surface coat layer that occurs at the time of evaporation of a solvent component contained in a mixed solution for use in forming the mirror-surface coat layer.

Effects of Invention

In accordance with the present invention, it is possible to provide a resin molding mold which can generate gloss comparatively easily on the product surface of a resin molded product even in the case of using the resin molding mold having concavo-convex portions provided by embossing, and obtain a resin molded product having improved texture by providing high luster.

These and other objects, features and advantages of the present invention will become apparent upon consideration of the following description of the preferred embodiments of the present invention taken in conjunction with the accompanying drawing.

BRIEF DESCRIPTION OF DRAWINGS

FIG. 4(a) is a front view, and FIG. 4(b) is a side view.

DETAILED DESCRIPTION OF THE INVENTION

1. Resin Molding Mold

Figure 1:
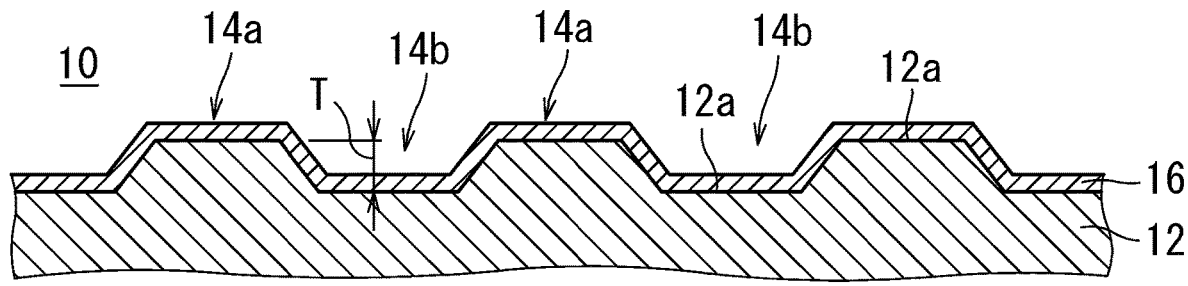
FIG. 1 is a cross-sectional illustration showing an example of a resin molding mold in accordance with the present invention.
Figure 2:
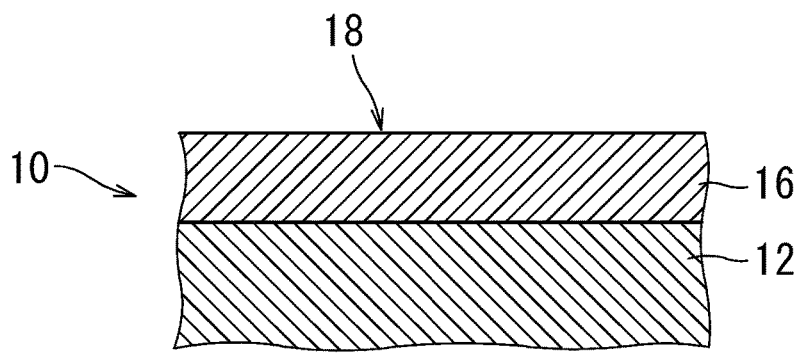
FIG. 2 is an enlarged cross-sectional view in which a portion corresponding to a mirror-surface coat layer of the resin molding mold shown in FIG. 1 is enlarged.
Figure 3:
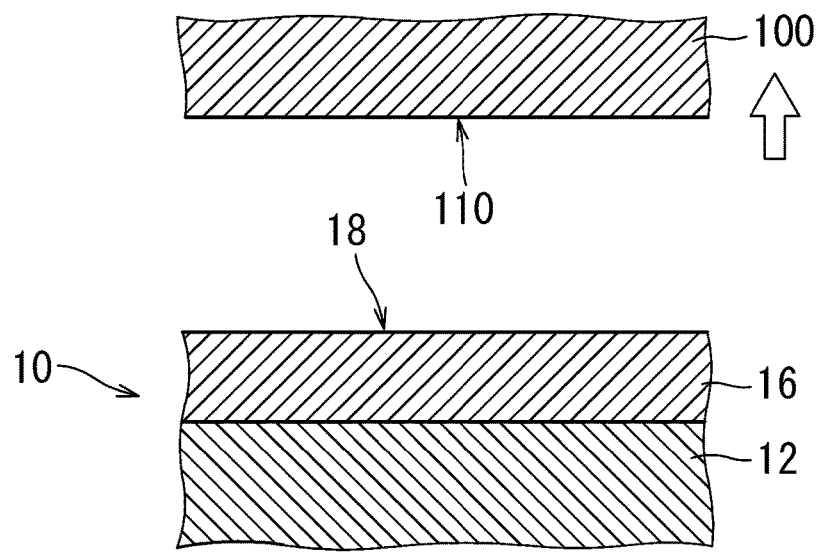
FIG. 3 is a cross-sectional illustration showing a state in which a resin molded product injection-molded by using the resin molding mold in accordance with the invention is drawn therefrom.
Figure 4:
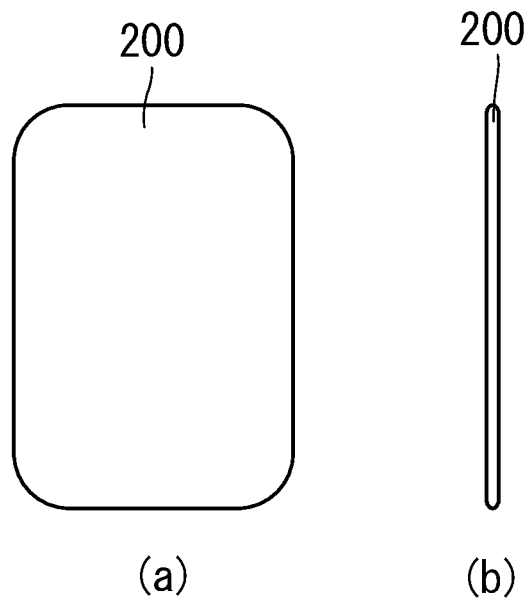
FIG. 4(a) and FIG. 4(b) show an external appearance of a test plate of a resin molded product used in an experiment.

FIG. 1 is a cross-sectional illustration showing an example of a resin molding mold in accordance with the present invention, and FIG. 2 is an enlarged cross-sectional view in which a portion corresponding to a mirror-surface coat layer of the resin molding mold shown in FIG. 1 is enlarged. FIG. 3 is a cross-sectional illustration showing a state in which a resin molded product injection-molded by using the resin molding mold in accordance with the invention is drawn therefrom.

A resin molding mold 10 includes a molding mold 12.

The molding mold 12 can be made of a material capable of being heated at least to 150° C., and is formed by using, for example, a metal material, such as iron steel material, aluminum, ZAS or the like, or a synthetic resin material. The mold surface 12a of the molding mold 12 is subjected to an embossing process, for example, by etching, with the result that an embossing formation convex portion 14a and an embossing formation concave portion 14b are formed. The maximum height T between the embossing formation convex portion 14a and the embossing formation concave portion 14b obtained by the embossing process is preferably set to 10 μm or more. When this is less than 10 μm, a portion of the embossing formation concave portion 14b is undesirably buried by a mirror-surface coat layer 16 to be described later.

Moreover, a drawing gradient for use in injection-molding is formed in the molding mold 12. This drawing gradient is specified in relation to the maximum height T between the embossing formation convex portion 14a and the embossing formation concave portion 14b formed by the embossing process, and for example, when the maximum height T between the embossing formation convex portion 14a and the embossing formation concave portion 14b is 10 μm, it is set to about 1 degree.

The embossing process is a process for forming a concavo-convex shaped pattern, such as leather embossing, geometrical embossing, satin embossing or the like. The embossing pattern includes a leather embossing pattern, a skin texture pattern, a wood grain pattern, a satin pattern, a leaf vein pattern, a scale pattern, a marble pattern, a hair line pattern, a geometrical pattern, a polishing pattern, a coating pattern, or the like.

Additionally, the embossing process may form a concavo-convex shaped pattern by using a method other than etching, and for example, the pattern may be formed by carving, a machining process, or polishing lines.

Moreover, in the embossing process, a concavo-convex shaped pattern may be partially formed by the mold surface 12a of the molding mold 12. In this case, the mold surface 12a of the molding mold 12 without embossing formed thereon is formed into a mirror surface.

Furthermore, the embossing process is not necessarily carried out on the entire surface of the mold surface 12a of the molding mold 12. In this case, the entire surface of the mold surface 12a of the molding mold 12 without embossing formed thereon is formed into a mirror surface.

The resin molding mold 10 includes the mirror-surface coat layer 16 formed on the entire surface of the mold surface 12a of the molding mold 12. Additionally, the mirror-surface coat layer 16 may be formed only on one portion of the mold surface 12a of the molding mold 12.

Moreover, the surface of the mirror-surface coat layer 16 has a flat-surface maintaining part 18 formed into a substantially flat surface.

The mirror-surface coat layer 16 includes at least a thermosetting resin. The mirror-surface coat layer 16 is formed so as to have a thickness in a range from 1.0 μm or more to 30 μm or less. Moreover, the thickness of the mirror-surface coat layer 16 is preferably set to 20 μm or less. When the thickness of the mirror-surface coat layer 16 exceeds 20 μm, waving occurs on the surface of the mirror-surface coat layer 16, and since, when it exceeds 30 μm, the waving on the surface of the mirror-surface coat layer 16 appears more conspicuously, it becomes difficult to generate gloss having high texture on the product surface of a resin molded product. Furthermore, the thickness of the mirror-surface coat layer 16 is smaller than at least the maximum height T between the embossing formation convex portion 14a and the embossing formation concave portion 14b formed by the embossing process. In the case when the thickness of the mirror-surface coat layer 16 is larger than the maximum height T between the embossing formation convex portion 14a and the embossing formation concave portion 14b formed by the embossing process, since the concave-convex portions formed by embossing are buried, the embossing process is no longer carried out on the resin molded product. This mirror-surface coat layer 16 may be formed on both of the core mold and cavity mold, or the mirror-surface coat layer 16 may be formed only on the cavity mold.

Additionally, the thickness of the mirror-surface coat layer 16 can be measured by, for example, an electromagnetic eddy-current film thickness meter (made by Sanko Electronic Laboratory Co., Ltd., model number: SWT-9100).

With respect to the thermosetting resin to be used for the mirror-surface coat layer 16, heat resistant property, mold-releasing property, adhesiveness to the mold surface 12a of the molding mold 12, wear resistance, etc. are required. With respect to the heat resistance, those which are not fused at a temperature of less than 100° C. are preferably used, and the curing temperature of the thermosetting resin is set in accordance with the heat resistant temperature of the molding mold 12. For example, in the case when the mirror-surface coat layer 16 is formed on a molding mold 12 made of a material having a low melting point, such as aluminum, ZAS or the like, a thermosetting resin that is cured at a temperature range from 100° C. or more to 150° C. or less is used in accordance with the heat resistant temperature of the mold material. With respect to the wear resistance, those which have a sufficient resistance to the flow of fused matters of the resin at the time of an injection molding are preferably used. For example, in the case of a molding process by using a synthetic resin, for example, at the time of an injection molding process, those materials that are resistant to molding processes of 1000 shots or more are preferably used. This is because upon molding resin molded products, a large number of resin molded products are molded by using the same molding mold 12. As described earlier, since the thickness of the mirror-surface coat layer 16 is set in a range from 1.0 μm or more to 30 μm or less, and preferably set to 20 μm or less, the resulting mold can be resistant to a more number of molding processes of resin molded products.

Moreover, in order to satisfy the above-mentioned requirements for the mirror-surface coat layer 16, as the thermosetting resin to be used for the mirror-surface coat layer 16, those materials having a high heat insulating property are used. For example, as the thermosetting resin to be used for the mirror-surface coat layer 16, a thermosetting resin having a thermal conductivity in a range from 0.10 W/(mK) or more to 0.99 W/(mK) or less is used.

As the thermosetting resin to be used for the mirror-surface coat layer 16, a phenolic resin, an alkyd resin, a melamine urea resin, an epoxy resin, a polyurethane resin, a silicone resin, a chloride rubber-based resin, a vinyl acetate resin, an acrylic resin, a vinyl chloride resin, a fluorine resin, cellulose, a polystyrene resin, or the like may be used, and ether a single substance or a copolymer may be used.

2. Production Method of Resin Molding Mold

The following description will discuss a production method of a resin molding mold in accordance with the present invention.

First, a molding mold 12 subjected to an embossing process is prepared. By this embossing process, on a mold surface 12a of the molding mold 12, an embossing formation convex portion 14a and an embossing formation concave portion 14b are formed.

As a base material for the molding mold 12, a material capable of being heated at least to 150° C. can be used, and for example, a metal material, such as iron steel material, aluminum, ZAS or the like, and a synthetic resin material may be used.

Moreover, on the mold surface 12a of the molding mold 12, if necessary, an embossing process for forming a concavo-convex shaped pattern, such as leather embossing, geometrical embossing, satin embossing or the like, is carried out. The embossing pattern is selected from the group consisting of a leather embossing pattern, a skin texture pattern, a wood grain pattern, a satin pattern, a leaf vein pattern, a scale pattern, a marble pattern, a hair line pattern, a geometrical pattern, a polishing pattern, a coating pattern and the like. On the other hand, no embossing process is sometimes carried out on the mold surface 12a of the molding mold 12.

Furthermore, in order to form a mirror-surface coat layer 16 in a process to be carried out later, the mold surface 12a of the molding mold 12 is degreased and washed.

Next, the mirror-surface coat layer 16 is formed on the mold surface 12a of the molding mold 12.

First, in order to form the mirror-surface coat layer 16, a thermosetting resin is prepared. Then, a mixed solution which is formed by dispersing the thermosetting resin thus prepared in a solvent is prepared.

With respect to the thermosetting resin to be used for the formation of the mirror-surface coat layer 16, a phenolic resin, an alkyd resin, a melamine urea resin, an epoxy resin, a polyurethane resin, a silicone resin, a chloride rubber-based resin, a vinyl acetate resin, an acrylic resin, a vinyl chloride resin, a fluorine resin, cellulose, a polystyrene resin, or the like is used, and ether a single substance or a copolymer may be used.

As a solvent to be used for forming the mirror-surface coat layer 16, propylene glycol monomethyl ether acetate, propylene glycol monomethyl ether, n-butyl acetate, n-butyl alcohol, methyl alcohol and ethylene glycol monomethyl ether acetate may be used. Additionally, in the mixed solution used for forming the mirror-surface coat layer 16, the dilution rate of the solvent is set from 5% or more to 20% or less.

Successively, in order to form the mirror-surface coat layer 16, the mixture thus prepared is coated onto the mold surface 12a of the molding mold 12 by using, for example, a spraying method so as to have a thickness in a range from 1.0 μm or more to 30 μm or less. Additionally, the mirror-surface coat layer 16 is preferably coated so as to have a thickness of 20 μm or less.

The spraying conditions of the mixed solution for forming the mirror-surface coat layer 16 are set so that, for example, a coating pressure (pneumatic pressure) is 0.25 MPa, the diameter of a spray gun is 0.8 mm and a coating distance is in a range from 15 cm or more to 40 cm or less. Moreover, the spraying process is carried out in possibly a vertical direction relative to the mold surface 12a of the molding mold 12 to be coated. This arrangement is made so as to allow the mirror-surface coat layer 16 to be coated uniformly on the mold surface 12a of the molding mold 12. The place in which the coating is carried out is, for example, a coating room.

Additionally, the mirror-surface coat layer 16 may be formed not on the entire surface of the mold surface 12a of the molding mold 12, but on a partial portion thereof.

Thereafter, the molding mold 12 coated with the mixed solution is baked at a baking temperature from 100° C. or more to 150° C. or less for 2 hours or more to 5 hours or less so that the mirror-surface coat layer 16 is formed on the mold surface 12a of the molding mold 12; thus, a resin molding mold 10 is obtained.

3. Resin Molded Product

By using this resin molding mold 10, an injection-molding process is carried out using a thermosetting resin heated and melted. The materials of the thermoplastic resin to be molded by using the present resin molding mold 10 include, for example, polypropylene (PP), an ABS resin that is a copolymer synthetic resin of acrylonitrile, butadiene and styrene, polyvinyl chloride (PVC), etc. Moreover, with respect to the thickness of the resin molded product, not particularly limited, molded products having a desired thickness may be produced.

A product surface 110 of the resin molded product 100 of FIG. 3 molded by using the resin molding mold 10 has a sufficient gloss with high luster.

In accordance with the resin molding mold 10 of FIG. 1, since the thickness of the mirror-surface coat layer 16 is set in a range from 1.0 μm or more to 30 μm or less, it is possible to prevent scratches (galling) due to protrusions on the inside surface of the molding mold relative to the drawing direction and scratches caused by tension or rubbing given to the resin molded product 100 having embossing due to its resin contraction at the time of curing process from occurring on the resin molded product 100 at the time of drawing the resin molded product 100 from the resin molding mold 10.

Moreover, since the thickness of the mirror-surface coat layer 16 is set in a range from 1.0 μm or more to 30 μm or less, it is possible to suppress disturbance due to waving on the flat-surface maintaining part 18 occurring at the time of evaporation of a solvent component when the mirror-surface coat layer 16 is formed.

Furthermore, since the thickness of the mirror-surface coat layer 16 is set in a range from 1.0 μm or more to 30 μm or less, it is possible to suppress liquid dripping at the time when a mixed solution is applied onto the mold surface 12a of the molding mold 12 with concavo-convex portions formed thereon by embossing process so as to form the mirror-surface coat layer 16.

Since the thickness of the mirror-surface coat layer 16 is set in a range from 1.0 μm or more to 30 μm or less, the layer becomes resistant to a more number of injection-molding processes for resin molded products.

Therefore, since the flat-surface maintaining part 18 of the mirror-surface coat layer 16 of the resin molding mold 10 is capable of ensuring a stable flat-surface state, it becomes possible to prevent a defective external appearance from occurring on the product surface of a resin molded product 100 when an injection-molding process is carried out by using the resin molding mold 10, thereby making it possible to obtain a resin molded product having improved texture by providing high luster.

Moreover, in the case when the thickness of the mirror-surface coat layer 16 is set to 20 μm or less, it becomes possible to more effectively suppress disturbance due to waving on the surface of the flat-surface maintaining part 18 occurring at the time of evaporation of a solvent component contained in a mixed solution for use in forming the mirror-surface coat layer 16.

Experimental Example

Experiments were carried out in which a test plate 200 of a resin molding mold in which a mirror-surface coat layer 16 was formed on a molding mold 12 serving as an example and a test plate 200 of a resin molding mold in which no mirror-surface coat layer was formed on the molding mold serving as a comparative example were prepared, and the respective test plates 200 of the resin molding molds were evaluated. The evaluation was carried out by measuring the gloss value of the mold surface of each of the test plates of the resin molding molds.

1. Resin Molding Mold

Working Examples

All the base materials of test plates of molding molds of working example 1 to working example 3 were made by carbon steel for machine structural use (S50C). Moreover, the size of each of test plates of resin molding molds of working example 1 to working example 3 was set to 100 mm in longitudinal size, 150 mm in lateral size and 10 mm in thickness.

Furthermore, in working example 1 to working example 3, by using the conventional method, embossing processes were carried out. Additionally, in working example 1 to working example 3, the maximum height T between embossing formation convex portions and embossing formation concave portions by the embossing process was set to about 10 μm. On the mold surface of the test plate of each of the molding molds of working example 1 to working example 3, a mirror-surface coat layer was formed. An acrylic resin was used as a resin contained in these mirror-surface layers. In working example 1 to working example 3, the thicknesses of the mirror-surface coat layers were changed.

In working example 1 to working example 3, spraying conditions of the mixed solution for forming the mirror-surface coat layer were set as follows.

Coating pressure (pneumatic pressure): 0.25 MPa
Diameter of spray gun: 0.8 mm
Coating distance: 30 mm or more to 40 mm or less
Coating direction: possibly vertical to mold surface of molding mold
Coating place: coating room
Thickness of coating: see Table 1

Comparative Example

A test plate of a molding mold in accordance with comparative example 1 is subjected to a series of embossing processes including a surface treatment by sand blasting and glass beads in the same manner as in the embossing processes carried out on the molding mold of working example 1, and the test plate has no mirror-surface coat layer formed thereon. Moreover, the base material of all the molding molds of comparative example 1 was made by carbon steel for machine structural use (S50C). The size of the test plate of comparative example 1 was also set to the same size as the test plates of working example 1 to working example 3.

(Measuring Method)

The gloss value (luster degree of Gs (60°)) of the mold surface 12a of the test plate of the molding mold 12 was measured by using a gloss meter made by KONIKA MINOLTA, Inc. (trade name: UNI GLOSS GM-60). Gs (60°) refers to mirror surface luster (degree) at a measuring angle of 60 degrees.

The mirror surface luster degree was measured by the following method in accordance with a measuring method specified by JIS Z8741-1997 "Mirror Surface Luster Degree-Measuring Method". That is, by using a mirror surface luster degree measuring device in compliance with the above-mentioned standard, the reflectance of the surface was measured under a condition of incident angle=60°. Next, the measured value was converted to a percentage when the luster degree on the reference surface is defined as 100, and represented as the mirror surface luster degree. With respect to the reference surface, a black glass reference surface having a refractive index set to a constant value 1.567 all over the visible wavelength range, as specified by the above-mentioned standard, was used, and when the incident angle=60°, a mirror surface reflectance of 10% was defined as a luster degree 100. By using the gloss meter made by KONIKA MINOLTA Inc. (trade name: UNI GLOSS GM-60) corresponding to a mirror surface luster measuring device which, when measurements are carried out, automatically carries out the above-mentioned conversion, and outputs a mirror surface luster degree, the respective portions of the test plate surface were measured at N=5 under the condition of incident angle=60°, and the average value was defined as the mirror surface luster degree of each of the test plate surfaces. Additionally, as the gloss value (luster degree) becomes higher, the corresponding state means a gloss generated state.

Table 1 shows evaluation results of working example 1 to working example 3 as well as comparative example 1.

TABLE 1

|  | Thickness of mirror-surface coat layer (μm) | Mold surface having embossing of molding mold Average value (N = 5) of gloss values |
| --- | --- | --- |
| Working Example 1 | 5.2 | 15.4 |
| Working Example 2 | 10.3 | 41.0 |
| Working Example 3 | 20.0 | 59.4 |
| Comparative Example 1 | — | 2.1 |

Upon consideration of the average value of gloss values on the mold surface having embossing of the molding mold, it is in a range from 15.4 to 59.4 in working example 1 to working example 3, and it is 2.1 in comparative example 1; therefore, it is confirmed that the gloss is greatly improved by forming a mirror-surface coat layer on the mold surface of the molding mold. When the flat-surface maintaining part of the mirror-surface coat layer on each of the molding molds of working example 1 to working example 3 was confirmed, no disturbance due to waving was confirmed.

REFERENCE SIGNS LIST 10 resin molding mold
12 molding mold
12a mold surface
14a embossing formation convex portion
14b embossing formation concave portion
16 mirror-surface coat layer
18 flat-surface maintaining part
100 resin molded product
110 product surface
T maximum height between embossing formation convex portion and embossing formation concave portion

The invention claimed is:

1. A resin molding mold having an embossing pattern for forming a resin molded product having a gloss, the resin molding mold comprising:

a molding mold having a mold surface, the molding mold having a plurality of embossing formation convex portions and a plurality of embossing formation concave portions formed on the mold surface, wherein a difference in height between the embossing formation convex portions and the embossing formation concave portions is between 10 μm to 40 μm, wherein a lower surface of each of the embossing formation convex portions is substantially flat, wherein an upper surface of each of the embossing formation concave portions is substantially flat, wherein the lower surfaces of the embossing formation convex portions and the upper surfaces of the embossing formation concave portions are connected via a substantially flat and inclined surface; and a mirror-surface coat layer formed on the surfaces of the embossing formation convex portions and the embossing formation concave portions of the mold surface, wherein the mirror-surface coat layer is comprised of a thermosetting resin having a thermal conductivity in a range of 0.10 W/(mK) to 0.99 W/(mK) and a curing temperature in a range of 100° C. to 150° C., has a thickness in a range of 1.0 μm to 20 μm to suppress unevenness on a surface of the resin molded product, has a substantially flat surface area on each of the embossing formation convex portions and on each of the embossing formation concave portions, and has a glossiness measured by a 60 degree gloss meter in a range of 15.4 to 59.4 gloss units (GU); and wherein a selected thickness of the mirror-surface coat layer is smaller than a selected difference in height between the embossing formation convex portions and the embossing formation concave portions.

* * * * *